United States Patent Office 3,156,745
Patented Nov. 10, 1964

3,156,745
PROCESS FOR THE MANUFACTURE OF SHAPED STRUCTURES OF POLYOLEFINS HAVING IMPROVED DYEING PROPERTIES
Horst Behrenbruch, Kelkheim, Taunus, Wilhelm Happe, Schwalbach, Taunus, Hans Hoyer, Frankfurt am Main, and Emil Kinzinger, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed Dec. 6, 1960, Ser. No. 73,966
Claims priority, application Germany, Dec. 10, 1959, F 30,048
6 Claims. (Cl. 260—897)

The present invention relates to a process for improving the properties of shaped structures of polyolefins, in particular the properties of filaments made of superpolymers of this kind. The invention also provides a process for the manufacture of filaments and fibers of polyolefins which can readily be dyed.

It is known to improve dyeability of polyolefins by admixing, for example, alkylene imines, polyamides, polyamino triazols, polyurethanes or polyureas, with the polyolefins, melting the resulting mixtures and working them up into filaments.

It has, however, become apparent that the filaments obtained by the aforesaid process can be dyed with colours of little depth only and that, moreover, the fastness properties of the dyeings are insufficient.

The object of the present invention is a process for preparing shaped structures, in particular filaments, that can readily be dyed. According to the invention, 0.1 to 30% by weight, preferably 5 to 15% by weight, of a polyvinyl ester is admixed with the polyolefins to be shaped, the precentages being calculated on the quantity by weight of the polyolefins. The resulting mixtures can very well be worked up from a melt or solution into filaments or fibers. The admixture of polyvinyl esters having a low melting point does not impair the spinning properties of the polyolefins, as would have been expected. The spinning properties of the polyolefins are not even impaired if larger quantities of the polyvinyl esters of low melting point are added. The filaments that are obtained by the process according to the invention can be dyed, in particular with dispersion dyestuffs, and thereby be provided with depths of colour which it has hitherto not been possible to produce on polyolefin fibers. By the admixture of the polyvinyl esters the physical properties of the filaments obtained, in particular their tensile strength, are practically not impaired. Particularly good tinctorial effects are obtained by adding copolymers of vinyl esters with unsaturated carboxylic acids, in particular crotonic acid, to the polyolefin to be shaped. In some cases the additives according to the invention lead to the formation of products which, in addition to an improved dyeability, possess an increased thermostability. As polyvinyl ester polyvinyl acetate is preferably used. Polyvinyl esters of homologous carboxylic acids, for example, polyvinyl propionate, polyvinyl butyrate and polyvinyl stearate, and/or copolymers of the aforesaid monomeric products with unsaturated carboxylic acids may also be used. The mixture of the polyvinyl esters and/or copolymers thereof with unsaturated carboxylic acids with the polyolefins is advantageously carried out in the following way: The said esters and/or copolymers which are in the dissolved state are sprayed on the polyolefin which is present in pulverulent or granular form, the polyvinyl esters are allowed to dry and the polymers are then thoroughly mixed. Alternatively, the polyvinyl esters and/or copolymers may be admixed in a finely powdered form with the polyolefins.

The following examples serve to illustrate the invention but they are not intended to limit it thereto, the parts being by weight.

Example 1

100 parts of pulverulent lineaur polyethylnee having a reduced specific viscosity of 1.2 (determined in a solution of 0.1% strength in dekalin at 135° C.) were sprayed, while stirring, with a solution of 5 parts of polyvinyl acetate (molecular weight about 200,000) in 50 parts of acetone. After evaporation of the solvent the mass was thoroughly mixed in a mixer for the purpose of homogenization. The mixture that had thus been pretreated was spun at 260° C. on a heated extruder which was provided with a nozzle, the resulting filaments were drawn off at a speed of 1000 meters per minute and subsequently stretched at 100° C. to four times their original length. The filaments that were thus obtained had a tensile strength of 3.1 grams per denier and an elongation at break of 35%. They could well be dyed fast tints by means of dispersion dyestuffs, for example, a dyestuff of the following formula

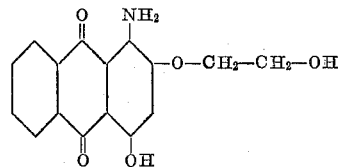

Example 2

100 parts of the granulate of linear polypropylene having a reduced specific viscosity of 1.9 (measured in a solution of 0.1% strength in dekalin at 135° C.) were sprayed with a solution of 15 parts of polyvinyl acetate in 150 parts of methyl acetate and the solvent was evaporated. The mass was then melted in an extruder, extruded and again worked up into a granulate which was transformed into filaments by the melt spinning process. The filaments that were thus obtained had a tensile strength of 3.8 grams per denier and an elongation at break of 25%. They could well be dyed by means of dispersion dyestuffs.

Example 3

100 parts of pulverulent linear polypropylene having a reduced specific viscosity of 1.9 (measured in a solution of 0.1% strength in dekalin at 135° C.) were intimately mixed with 5 parts of finely powdered polyvinyl propionate. The mixture was then spun into filaments in the manner described in Example 2. The resulting filaments could be provided with great depths of colour by means of dispersion dyestuffs.

Example 4

100 parts of pulverulent linear polypropylene having a reduced specific viscosity of 1.9 (determined in the way indicated in Example 2) were mixed with a solution of 5 parts of a copolymer of 95 parts of vinyl acetate and 5 parts of crotonic acid in 50 parts of acetone, the parts being calculated on the copolymer, and the solvent was evaporated. The mixture was spun from the melt into filaments which had an excellent capacity of being dyed by means of dispersion dyestuffs.

We claim:
1. A process for preparing readily dyeable filamentary structures of linear polyolefins selected from the group consisting of polyethylene and polypropylene, which consists essentially of admixing 0.1 to 30% by weight, calculated on the quantity by weight of polyolefins, of an additive consisting essentially of a polyvinyl ester selected from the group consisting of polyvinyl acetate, polyvinyl propionate, polyvinyl butyrate, polyvinyl stearate and co- polymers of vinyl esters selected from the group consisting of vinyl acetate, vinyl propionate, vinyl butyrate and vinyl stearate with unsaturated carboxylic acids with the polyolefins to be shaped and working up the polymer mixture into shaped structures by the melt spinning process.

2. The process of claim 1 wherein 5 to 15% by weight of a polyvinyl ester is admixed with the polyolefins to be shaped.

3. The process of claim 1 wherein 5 to 15% by weight of a copolymer of vinyl acetate and crotonic acid is admixed with the polyolefins.

4. The process of claim 1 wherein the polyolefin is linear polyethylene.

5. The process of claim 1 wherein the polyolefin is linear polypropylene.

6. A composition of matter consisting essentially of a linear polyolefin selected from the group consisting of polyethylene and polypropylene having admixed therewith from 0.1 to 30% by weight of an additive consisting essentially of a polyvinyl ester selected from the group consisting of polyvinyl acetate, polyvinyl propionate, polyvinyl butyrate, polyvinyl stearate, and copolymers of vinyl esters selected from the group consisting of vinyl acetate, vinyl propionate, vinyl butyrate and vinyl stearate with unsaturated carboxylic acids to improve the dyeability of the polyolefin.

References Cited in the file of this patent

UNITED STATES PATENTS

| | | |
|---|---|---|
| 2,448,666 | Fletcher et al. | Sept. 7, 1948 |
| 2,569,470 | Hagemeyer et al. | Oct. 2, 1951 |
| 2,772,247 | Schroeder | Nov. 27, 1956 |
| 2,944,040 | Pollock et al. | July 5, 1960 |
| 2,975,150 | Johnson et al. | Mar. 14, 1961 |

FOREIGN PATENTS

| | | |
|---|---|---|
| 1,050,002 | Germany | Feb. 5, 1959 |